United States Patent
Kobrin

(10) Patent No.: US 10,395,461 B2
(45) Date of Patent: Aug. 27, 2019

(54) ANTI-COUNTERFEITING FEATURES AND METHODS OF FABRICATION AND DETECTION

(71) Applicant: METAMATERIAL TECHNOLOGIES USA, INC., Pleasanton, CA (US)

(72) Inventor: Boris Kobrin, Dublin, CA (US)

(73) Assignee: METAMATERIAL TECHNOLOGIES USA, INC., Pleasanton, CA (US)

( * ) Notice: Subject to any disclaimer, the term of this patent is extended or adjusted under 35 U.S.C. 154(b) by 13 days.

(21) Appl. No.: 15/360,884

(22) Filed: Nov. 23, 2016

(65) Prior Publication Data

US 2017/0116808 A1   Apr. 27, 2017

Related U.S. Application Data

(63) Continuation of application No. PCT/US2014/039602, filed on May 27, 2014.

(51) Int. Cl.
*G07D 7/02* (2016.01)
*G07D 7/00* (2016.01)
(Continued)

(52) U.S. Cl.
CPC .............. *G07D 7/02* (2013.01); *B42D 25/351* (2014.10); *B42D 25/36* (2014.10); *B42D 25/373* (2014.10);
(Continued)

(58) Field of Classification Search
CPC .......... G07D 7/00; G07D 7/003; G07D 7/004; G07D 7/0043; G07D 7/0047; G07D 7/005;
(Continued)

(56) References Cited

U.S. PATENT DOCUMENTS 4,720,798 A   1/1988   Reed et al.
4,888,270 A   12/1989   Sullivan
(Continued)

FOREIGN PATENT DOCUMENTS

EP   1727220 A2   11/2006
EP   2028017 A2   2/2009
(Continued)

OTHER PUBLICATIONS

International Search Report and Written Opinion for International Application No. PCT/CH2008/000163, dated Sep. 9, 2008.
(Continued)

*Primary Examiner* — Hoai-An D. Nguyen
(74) *Attorney, Agent, or Firm* — McDonnell Boehnen Hulbert & Berghoff LLP

(57) ABSTRACT

Aspects of the present disclosure include an anti-counterfeiting pattern that is identifiable by sheet resistance mapping metrology, a method of fabricating such an anti-counterfeiting device, and a method of detecting such an anti-counterfeiting device by imaging the pattern with sheet resistance mapping metrology. This abstract is provided to comply with rules requiring an abstract that will allow a searcher or other reader to quickly ascertain the subject matter of the technical disclosure. It is submitted with the understanding that it will not be used to interpret or limit the scope or meaning of the claims.

28 Claims, 7 Drawing Sheets

(51) Int. Cl.
*B42D 25/351* (2014.01)
*B42D 25/378* (2014.01)
*B42D 25/42* (2014.01)
*B42D 25/36* (2014.01)
*B42D 25/373* (2014.01)
*G07D 7/12* (2016.01)
*G07D 7/005* (2016.01)

(52) U.S. Cl.
CPC .......... *B42D 25/378* (2014.10); *B42D 25/42* (2014.10); *G07D 7/003* (2017.05); *G07D 7/005* (2017.05); *G07D 7/12* (2013.01)

(58) Field of Classification Search
CPC ............... G07D 7/02; G07D 7/023; G07D 7/04; G07D 7/122; G07D 7/202; G07D 7/2033; G07D 7/205; G07D 7/206; G07D 7/207; G07D 2207/00; B42D 25/351; B42D 25/36; B42D 25/373; B42D 25/378; B42D 25/42; G01R 27/00; G01R 27/02; G01R 27/26; G01N 27/00; G01N 27/02; G01N 27/04
USPC ................ 324/600, 649, 691, 693
See application file for complete search history.

(56) References Cited

U.S. PATENT DOCUMENTS

| | | | |
|---|---|---|---|
| 5,689,237 A * | 11/1997 | Sasagawa | G08B 13/1454 340/572.8 |
| 6,118,377 A | 9/2000 | Bonkowski et al. | |
| 6,148,166 A | 11/2000 | Watanabe | |
| 6,162,264 A | 12/2000 | Miyazaki et al. | |
| 6,171,876 B1 | 1/2001 | Yuang et al. | |
| 6,207,472 B1 | 3/2001 | Callegari et al. | |
| 6,406,643 B2 | 6/2002 | Chung | |
| 7,144,539 B2 | 12/2006 | Olsson | |
| 8,182,982 B2 | 5/2012 | Kobrin | |
| 8,192,920 B2 | 6/2012 | Kobrin | |
| 8,318,386 B2 | 11/2012 | Kobrin | |
| 8,334,217 B2 | 12/2012 | Kobrin | |
| 8,425,789 B2 | 4/2013 | Kobrin | |
| 8,518,633 B2 | 8/2013 | Kobrin et al. | |
| 9,069,244 B2 | 6/2015 | Kobrin | |
| 9,116,430 B2 | 8/2015 | Kobrin et al. | |
| 9,244,356 B1 | 1/2016 | Kobrin et al. | |
| 9,465,296 B2 | 10/2016 | Kobrin | |
| 9,481,112 B2 | 11/2016 | Kobrin et al. | |
| 2003/0059820 A1 | 3/2003 | Vo-Dinh | |
| 2003/0059987 A1 | 3/2003 | Sirringhaus et al. | |
| 2004/0036993 A1 | 2/2004 | Tin | |
| 2004/0056939 A1 | 3/2004 | Thavarajah et al. | |
| 2004/0131782 A1 | 7/2004 | Hasei et al. | |
| 2005/0224452 A1 | 10/2005 | Spiess et al. | |
| 2006/0014108 A1 | 1/2006 | Ito et al. | |
| 2006/0099333 A1 | 5/2006 | Cheong et al. | |
| 2006/0128165 A1 | 6/2006 | Theiss et al. | |
| 2006/0213870 A1 | 9/2006 | Waldrop et al. | |
| 2006/0283539 A1 | 12/2006 | Slafer | |
| 2007/0012950 A1 | 1/2007 | Cain et al. | |
| 2007/0138699 A1 | 6/2007 | Wuister et al. | |
| 2007/0200276 A1 | 8/2007 | Mackey et al. | |
| 2008/0199663 A1 | 8/2008 | Burmeister | |
| 2009/0046362 A1 | 2/2009 | Guo et al. | |
| 2009/0130607 A1 | 5/2009 | Slafer | |
| 2009/0269705 A1 | 10/2009 | Kobrin | |
| 2009/0297989 A1 | 12/2009 | Kobrin | |
| 2009/0305513 A1 | 12/2009 | Kobrin | |
| 2010/0001508 A1 | 1/2010 | Tompkin et al. | |
| 2010/0003904 A1 | 1/2010 | Duescher | |
| 2010/0035163 A1 | 2/2010 | Kobrin | |
| 2010/0123885 A1 | 5/2010 | Kobrin | |
| 2011/0210480 A1 | 9/2011 | Kobrin | |
| 2011/0266521 A1 | 11/2011 | Ferrari et al. | |
| 2012/0121820 A1 | 5/2012 | Kaplan et al. | |
| 2012/0162629 A1 | 6/2012 | Kobrin | |
| 2012/0183741 A1 | 7/2012 | Kim et al. | |
| 2012/0237731 A1 | 9/2012 | Boegli et al. | |
| 2012/0243094 A1 | 9/2012 | Boegli | |
| 2013/0162740 A1 * | 6/2013 | Shaarawi | B41M 5/502 347/100 |
| 2013/0224636 A1 | 8/2013 | Kobrin | |
| 2013/0287263 A1 * | 10/2013 | Wei | G06K 9/00147 382/108 |
| 2013/0323651 A1 | 12/2013 | Solak et al. | |
| 2014/0063611 A1 * | 3/2014 | Raymond | B42D 15/00 359/619 |
| 2014/0202986 A1 | 7/2014 | Renaldo et al. | |
| 2014/0221864 A1 * | 8/2014 | Garber | A61B 5/0536 600/533 |
| 2015/0064628 A1 | 3/2015 | Guo | |
| 2017/0116808 A1 | 4/2017 | Kobrin | |
| 2017/0141915 A1 * | 5/2017 | Aihara | G01R 27/2605 |

FOREIGN PATENT DOCUMENTS

| | | | |
|---|---|---|---|
| JP | 60050535 A | 3/1985 | |
| JP | 61120961 A * | 6/1986 | ........... G01N 27/046 |
| JP | 63226071 A | 9/1988 | |
| JP | H07-243198 A | 9/1995 | |
| JP | 2006114817 A | 4/2006 | |
| JP | 2008126475 A | 6/2008 | |
| JP | 2011189508 A | 9/2011 | |
| KR | 20080026698 A | 3/2008 | |
| KR | 20110008159 A | 1/2011 | |
| WO | 9909603 A | 2/1999 | |
| WO | 9964251 A1 | 12/1999 | |
| WO | 2005022969 A2 | 3/2005 | |
| WO | 2007020442 A3 | 5/2007 | |
| WO | 2008069565 A1 | 6/2008 | |
| WO | 2008128365 A1 | 10/2008 | |
| WO | 2009094009 A1 | 7/2009 | |
| WO | 2010007405 A1 | 1/2010 | |
| WO | 2011087896 A2 | 7/2011 | |
| WO | 2013158543 A1 | 10/2013 | |
| WO | 2015183243 A1 | 12/2015 | |

OTHER PUBLICATIONS

International Search Report and Written Opinion for International Application No. PCT/US2008/012901, dated Feb. 6, 2009.
International Search Report and Written Opinion for International Application No. PCT/US2013/036582, dated Jul. 18, 2013.
International Search Report and Written Opinion for International Application No. PCT/US2014/039602, dated Mar. 12, 2015.
Non-Final Office Action for U.S. Appl. No. 14/244,803, dated Aug. 10, 2015.

* cited by examiner

ANTI-COUNTERFEITING FEATURES AND METHODS OF FABRICATION AND DETECTION

CLAIM OF PRIORITY

This Application is a continuation of International Application Number PCT/US2014/039602, filed May 27, 2014, the entire contents of which are incorporated herein by reference.

FIELD OF THE DISCLOSURE

The present disclosure is related to the field of anti-counterfeiting and authentication devices. More specifically, aspects of the present disclosure are related to nanostructured devices with anti-counterfeiting features and methods of fabricating the same.

BACKGROUND

This section describes background subject matter related to the disclosed embodiments of the present invention. There is no intention, either express or implied, that the background art discussed in this section legally constitutes prior art.

Nanostructuring is necessary for many present applications and industries and for new technologies which are under development. Improvements in efficiency can be achieved for current applications in areas such as solar cells and LEDs, next generation data storage devices, architectural glass and bio- and chemical sensors, for example and not by way of limitation.

Nanostructured substrates may be fabricated using techniques such as e-beam direct writing, Deep UV lithography, nanosphere lithography, nanoimprint lithography, near-field phase shift lithography, and plasmonic lithography, for example.

There is a need to identify nanostructures produced using specific equipment and process in order to protect and enforce Intellectual Property (IP) rights. Some desirable features for anti-counterfeiting features/systems are a) they should be quite difficult to find and/or replicate; b) they should be manufactured using mass production methods in order to keep added cost down; and c) flexibility to change the anti-counterfeiting system frequently to avoid adoption of the method or system by counterfeiters.

Various approaches have been proposed for counterfeit prevention and for authentication of documents or valuable articles. Some of these methods are clearly visible to the naked eye and are intended for the general public, while others are hidden and only detectable by the competent authorities, or by automatic devices. For example, some methods use special paper, special inks, watermarks, microletters, security threads, holograms, etc. Nevertheless, there is still an urgent need to develop and or embed anti-counterfeiting features or systems to a nanostructured device seamlessly and non-intrusively.

It is within this context that the present invention arises.

DETAILED DESCRIPTION

Figure 1A:
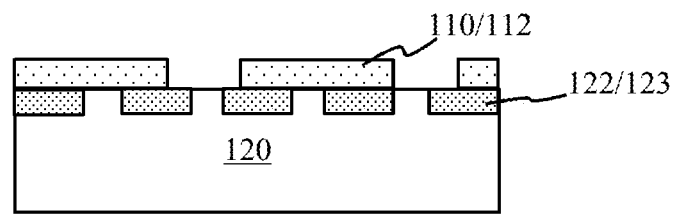
FIGS. 1A-1C shows cross-sectional views of anti-counterfeiting devices according to aspects of the present disclosure.

The present disclosure generally relates to a device that incorporates an anti-counterfeiting pattern invisible to unaided human eyes but recognizable as anti-counterfeiting features by sheet resistance mapping metrology. Sheet resistance is a measure of resistance of thin films that are nominally uniform in thickness. It is commonly used to characterize materials made by semiconductor doping, metal deposition, resistive paste printing and glass coating.

Sheet resistance $R_s$ for a film of material of resistivity $\rho$ and thickness t is given by the ratio $$R_s = \rho/t$$

A common unit for sheet resistance is "ohms per square" (denoted "Ω/sq" or "Ω/□"), which is dimensionally equal to an ohm, but is exclusively used for sheet resistance. The name "ohms per square" reflects the fact that a square sheet with sheet resistance of, e.g., 10 ohm/square has an actual resistance of 10 ohm, regardless of the size of the square.

Several measuring methods have been implemented for sheet resistance measurement. For example, the four point measuring method uses a simple apparatus including a four point probe for measuring the resistivity of semiconductor samples. By passing a current through two outer probes and measuring the voltage through the inner probes allows the measurement of the substrate resistivity. Although possible in principle, four point probe measurements tend to be time consuming and limited in resolution. Moreover, four point probe techniques are impractical for samples (e.g., metal mesh) that are protected (e.g., covered) with a polymer/barrier, or disposed under a functional material.

In addition, non-contact and non-destructive methods have been widely used. Eddy current testing is one of the most extensively used non-destructive techniques for inspecting electrically conductive materials that does not require any contact between the sample and the sensor. Eddy currents are electric currents induced within conductors by a changing magnetic flux in the conductor. These circulating eddies of current have inductance and thus induce magnetic fields. These fields can cause repulsion, attraction, propulsion, drag, and heating effects. The stronger the applied magnetic field, the greater the electrical conductivity of the conductor. The faster the field changes, the greater the currents that are developed and the greater the fields produced. For this method, a sample under test is placed between two coils. Such a configuration may provide two magnetic fields that penetrate the sample, and the interaction between the magnetic fields and the sample induces eddy currents in the sample. The sample is then subjected to a relatively evenly distributed field so as to obtain an accurate sheet resistance measurement. The measuring accuracy of standard Eddy current metrology may be about less than 2% accuracy for a sensor covering the sheet resistance range between 0.1-10 ohm/sq. The accuracy may be about less than 3% accuracy for a sensor covering the range between 10-100 ohm/sq. The accuracy may be about better than 5% for a sensor covering the range between 100-1000 ohm/sq. Eddy current metrology provides non-contact, proximity (few mm distance) measurements, can scan a sample area relatively quickly compared to four point probe techniques, and can sense sheet resistance properties through some functional/protective/films and coatings.

Terahertz (Thz) microprobe-based technology is another non-contact method that can be used for high-resolution measurements of sheet resistance distributions on large-scale areas. Specifically, AMO-GmbH, Germany proposed a measurement tool employing THz radiation in combination with contactless THz microprobes that enables micron-scale resolution and high-speed full wafer mapping. THz radiation penetrates fairly well through thin conductor layers with a thickness below skin-depth. In addition, the contactless THz microprobes can measure the sheet resistivity and thickness of large-area conductor films at very high speeds and up to 10 μm resolution. The term "Terahertz radiation" is used to describe electromagnetic radiation with frequencies between the high-frequency edge of the millimeter wave band, 300 gigahertz ($3 \times 10^{11}$ Hz), and the low frequency edge of the far-infrared light band, 3000 GHz ($3 \times 10^{12}$ Hz). Corresponding vacuum wavelengths of radiation in this band range from about 1 mm to about 0.1 mm (or 100 μm).

It should be noted that the above describes some example methods commonly used in the industry for sheet resistance mapping measurement. The term "sheet resistance mapping metrology" used in this disclosure is not limited to the measuring methods described above but also other methods applied for sheet resistance mapping measurement.

Figure 1B:
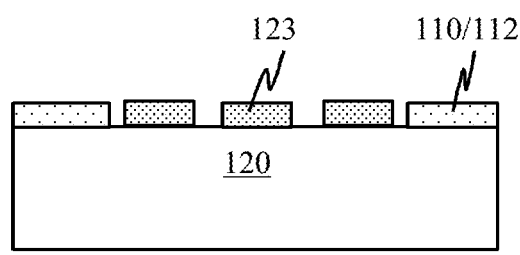
Figure 1C:
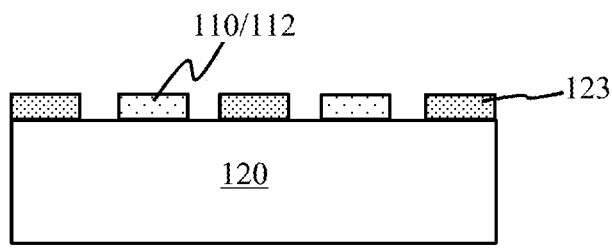

FIGS. 1A-1C show three examples of an anti-counterfeiting device according to aspects of the present disclosure. The anti-counterfeiting device generally includes a structure 110 with an anti-counterfeiting pattern 112. In one example, the structure 110 may be a conductive material.

The anti-counterfeiting pattern 112 will be discussed in detail below. FIG. 1A shows an anti-counterfeiting device formed on top of a substrate 120 and a device layer 122 over the substrate. In one implementation, the substrate 120 may be a transparent conductive layer. By way of example and not by way of limitation, the substrate 120 may be a glass or polymer material. The device layer 122 may have device features 123 (e.g., integrated circuit structures) formed on it. By way of example, the device layer 122 may include conductive materials, semiconductor materials, insulating materials, or some combination of two or more or even all three types of materials in the structures that form the device features.

As used herein, the term "substrate" generally refers to an object or structure onto which a layer is formed. In some contexts, the term substrate may refer to a single layer of material. In other contexts, the term substrate may refer to a structure made up of multiple layers.

Figure 2A:
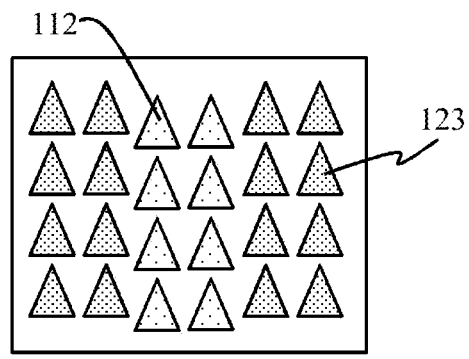
FIG. 2A-2B shows top views of anti-counterfeiting patterns according to aspects of the present disclosure.

FIG. 2A shows an anti-counterfeiting device formed in the same layer with the device features 123 over the substrate 120. The structure 110 with the anti-counterfeiting pattern 112 may be placed in areas that do not affect the performance of a device. FIG. 1C shows another embodiment where the anti-counterfeiting structure 110 formed hidden among the device features 123. The anti-counterfeiting structure 110 could be a non-functional structure hidden among the device features 123. Alternatively, one or more functional device features 123 could be configured to also serve as the anti-counterfeiting structure 110.

The size of the anti-counterfeiting structure 110 could be large or small. In one example, the anti-counterfeiting structure 110 may be large enough in a size to cover the entire area of the device. In other examples, the anti-counterfeiting structure 110 may be in a size less than 100 micron×100 micron. By way of example, and not by way of limitation, an anti-counterfeiting structure 110 having an area about 100 micron would be large enough to be detected by sheet resistance mapping that utilizes Thz microprobe-based technology with at least 10 micron resolution.

The anti-counterfeiting pattern 112 should be invisible to the unaided human eye. That is, the anti-counterfeiting pattern 112 should not be visible to the naked eye without conventional aids (e.g., viewing under ultravoilet light or with optical filters or tools/equipment, such as magnifying glasses, microscopes, and the like. In some implementations, the anti-counterfeiting pattern 112 could be invisible to a conventionally-aided human eye.

In one embodiment, the lines in the anti-counterfeiting pattern 112 are characterized by a linewidth less than 2 microns. Lines below 2 microns are generally invisible to the unaided human eye. The pitch and/or height in the anti-counterfeiting pattern are not critical as long as they are within reasonable limits. In one example, the pitch in the anti-counterfeiting pattern is about 2× the linewidth, and the height is about the same size of the linewidth or smaller. In addition, the anti-counterfeiting pattern 112 could be designed and made to have a very similar optical transmission, color and haze (below the sensitivity of the unaided human eye) to the substrate and/or surrounding materials, thus to be absolutely invisible to the human eye.

Figure 2B:
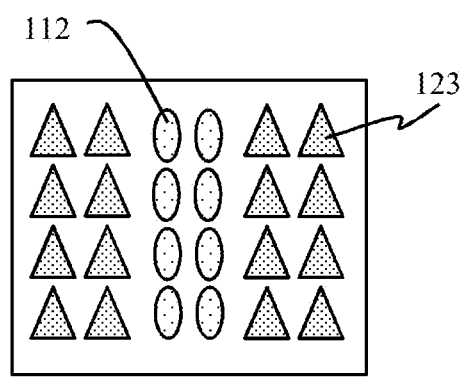

The anti-counterfeiting pattern 112 contains features that are distinguishable from the surrounding device features and thus identifiable as anti-counterfeiting features upon detection by sheet resistance mapping metrology. In one implementation, the anti-counterfeiting pattern 112 may be in the form of recognizable characters, such as letters, numbers, symbols, company logo, etc. In some implementations, the anti-counterfeiting pattern 112 may be a pattern similar to the surrounding device features that is deliberately shifted and/or rotated to make them stand out as shown in FIG. 2A. In some other implementations, the anti-counterfeiting pattern 112 may be in a distinctly different shape than the surrounding device features. In one example as shown in FIG. 2B, the anti-counterfeiting patterns may be ovals and the surrounding device features have a pattern of triangles. In certain implementations, the anti-counterfeiting pattern may be a bar code. In some other implementations, the anti-counterfeiting pattern may be any other coded structure or pattern. In one implementation, the anti-counterfeiting pattern has features in lower density comparing to the density of the surrounding device features. In some implementations, the anti-counterfeiting pattern is characterized by a specific gradient of sheet resistance, e.g., due to a thickness gradient. That is, the anti-counterfeiting pattern has unique pattern of sheet resistance that may have much larger variations of sheet resistance to be outside of measurement noise and may be identifiable as anti-counterfeiting features upon detection.

The anti-counterfeiting pattern 112 invisible to unaided human eyes is readily recognizable as anti-counterfeiting features that are provided deliberately on a device, when it is imaged with sheet resistance mapping metrology. The anti-counterfeiting structure should be sufficiently different in appearance from the surrounding device features so that the anti-counterfeiting pattern stands out in a sheet resistance map. Depending on the sensitivity of detection/interrogation equipment, the difference may be small but must be above the noise level. The interrogation may be performed by using sheet resistance mapping metrology tools to get a sheet resistance distribution map. Alternatively, the interrogation could be a combination of electrical and optical metrology. In one example, the anti-counterfeiting structure may be detected by utilizing sheet resistance mapping metrology tools in combination with optical tools (e.g., color filters, polarizers or optical metrology tools to detect optical transmission, haze and color).

Anti-counterfeiting devices according to aspects of the present disclosure may be very useful and advantageous in applications involving articles or documents that need to protect against illicit copying, such as credit cards, passports, driver licenses, valuable articles and/or nanostructured devices packaging for drugs, food, software, music, data CD and DVD, or other products, instrumentation and devices. Anti-counterfeiting devices according to aspects of the present disclosure may be placed on objects sensitive to light (so optical interrogation methods are not desirable or possible). Furthermore, no coding of anti-counterfeiting feature is necessary as long as an image of the feature can be clearly seen on a sheet resistance map. In another example, the device according to aspects of the present disclosure may be utilized as part of RFID tagging and a substrate (e.g., a transparent conductor) may be used as an antenna. The interrogation by sheet resistance mapping metrology tools may provide additional data about a product.

There are several ways for fabricating anti-counterfeiting device of the present disclosure. FIGS. 3A-3E are a sequence of cross-sectional schematic diagrams illustrating one possible method of fabrication of the device of FIG. 1A where the anti-counterfeiting device is formed on top of a substrate and a device layer. It should be understood that the anti-counterfeiting structure may be formed in the same layer with those device features over the substrate as in FIG. 1B or the anti-counterfeiting structure may be formed hidden within the device features as in FIG. 1C.

Figure 3A:
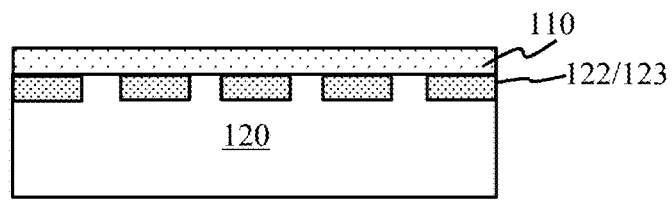
FIGS. 3A-3D are a sequence of cross-sectional schematic diagrams illustrating one possible method of fabrication of the device of FIG. 1A.
Figure 3B:
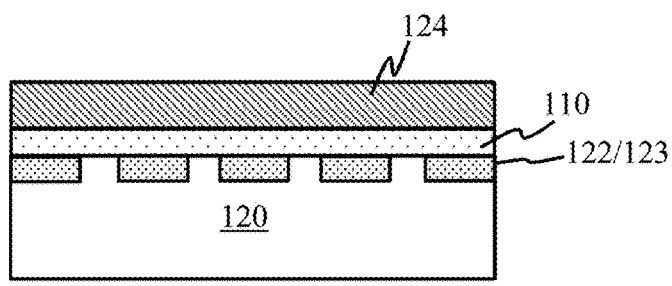

FIG. 3A depicts a structure 110 provided on a substrate 120. The substrate 120 may be a transparent conductive layer. A patterned device layer with device features 123 is deposited over the substrate. The structure 110 may be a conductive layer. A layer of photo-sensitive material 124 may be deposited over the structure 110 as shown in FIG. 3B. The photosensitive material 124 could be a photoresist. The photoresist could be a positive resist or a negative resist. A positive resist is a type of photoresist in which the portion of the photoresist that is exposed to light becomes soluble to the photoresist developer. The portion of the photoresist that is unexposed remains insoluble to the photoresist developer. A negative resist is a type of photoresist in which the portion of the photoresist that is exposed to light becomes insoluble to the photoresist developer. The unexposed portion of the photoresist is dissolved by the photoresist developer.

Figure 3C:
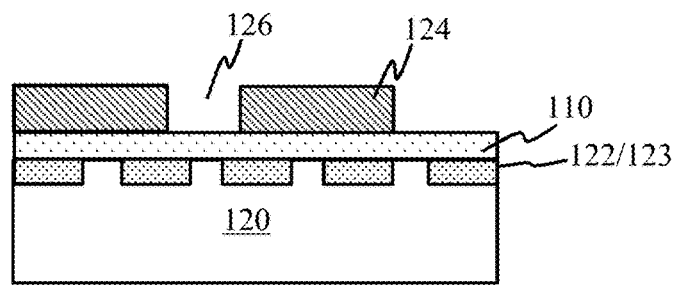
Figure 3D:
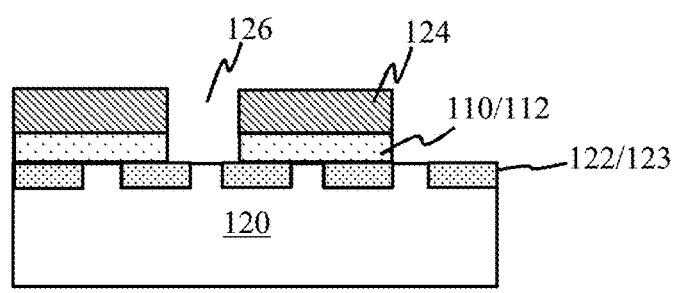

The photosensitive layer 124 may be patterned utilizing conventional photolithography or rolling mask lithography (RML) and then developed. The developed photosensitive layer 124 includes a pattern of openings 126 that expose underlying portions of the structure 110, as shown in FIG. 3C. The pattern of openings 126 is corresponding to an anti-counterfeiting pattern to be formed on the substrate 120. The patterned photosensitive material 124 and the structure 110 can be subjected to an etch process that removes portions of the structure 110 exposed by the openings 126 in the resist layer, as shown in FIG. 3D. The etch process can be an anisotropic process, such as a plasma etch process or ion milling. Remaining portions of the photosensitive material 124 can then be removed leaving behind the anti-counterfeiting pattern 112 as shown in FIG. 1A.

Figure 4A:
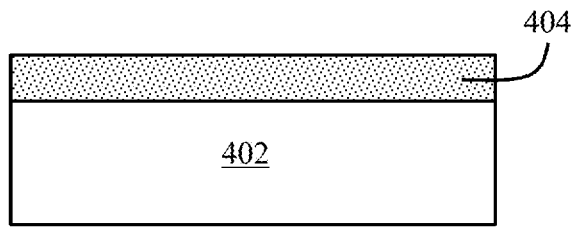
FIGS. 4A-4D illustrate an example of fabrication of metal mesh structures using a "lift-off" technique.
Figure 4B:
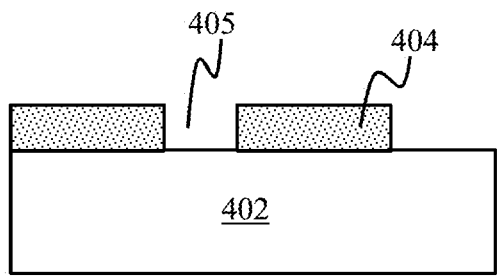

In an alternative implementation, metal mesh structures may be formed by deposition of materials through a template can be followed by lift-off of template materials (photoresists, etc.), e.g., as shown in FIGS. 4A-4D. In this technique, a layer of photosensitive material 404 (e.g., a positive or negative resist) is formed on a substrate 402, as shown in FIG. 4A. The substrate 402 can be, e.g., glass or a polymer material. The photosensitive layer 404 can be patterned using RML, e.g., as discussed above, and then developed. The developed photosensitive layer includes a pattern of openings 405 that expose underlying portions of the substrate 402, as shown in FIG. 4B.

Figure 4C:
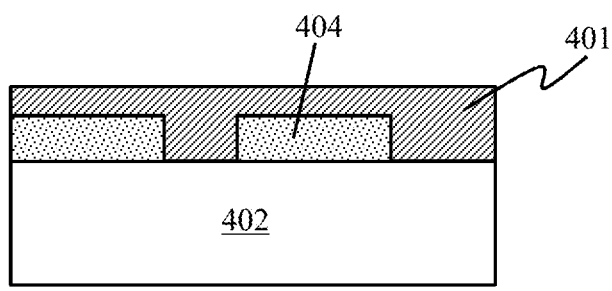

A layer of metal 401 is deposited over the patterned photosensitive material 404 as shown in FIG. 4C. Deposition of the metal layer 401 can be implemented using physical vapor deposition (PVD), sputtering, chemical vapor deposition (CVD), atomic layer deposition (ALD), MVD and other vacuum-based techniques. Non-vacuum methods can also be used, like sol-gel, electroplating, electroless plating, and the like. One preferred metal deposition technique that is useful for forming metal mesh structures is to deposit metal-containing materials from a liquid phase (e.g. as a metal ink) onto the substrate through the patterned photosensitive layer, e.g., using a roller. The metal material may also be sprayed onto the template and substrate. Also, other coating methods for liquid film deposition could be used such as, but not limited to, slot die and gravure coating. An example of such a technique is described, e.g., in U.S. Pat. No. 8,334,217, which is incorporated herein by reference. Metal-containing materials can be chosen to attach only to template materials or only to substrate material exposed through the template. The width and pitch of the metal mesh structures is determined by the corresponding pitch and width in the patterned rolling mask that is used to pattern the photosensitive layer. The thickness of the metal structures can be controlled by optimization of process transfer speed, viscosity of precursor, number of contact cycles with the roller, and other processing parameters.

Figure 4D:
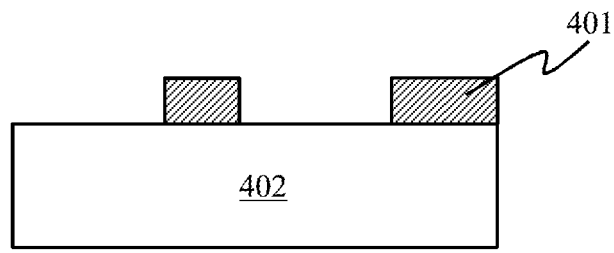

The patterned photosensitive material 404 is then removed in a lift-off process taking with it overlying portions of the metal layer 401. Portions of the metal layer that are in direct contact with the substrate remain behind following the liftoff process, leaving behind a pattern metal layer as shown in FIG. 4D. Some implementations that use a metal-containing ink to form the metal layer 401 include a sintering step to solidify the patterned metal layer. The sintering could take place before lift-off or afterwards.

Using lift-off in conjunction with RML does not require etching the metal layer, e.g., with plasma etch. Plasma etch is a vacuum process that is not compatible with processing of large area flexible substrates. Lift-off also allows for recycling of the metal portions that have been removed in the lift-off process.

Lift-off in conjunction with metal ink deposition is highly desirable because it removes any vacuum operation from the manufacturing process. Thus metal mesh fabrication can be implemented in a roll-to-roll process, as opposed to a batch process. In addition to being a vacuum process, etching can result in a roughened substrate and/or roughened metal line edges.

Another option for fabricating the anti-counterfeiting device is to form a pattern of conductive material on the substrate by conductive ink deposition using inkjet technology. For example, a pattern of metal ink could be formed with a conventional inkjet printer.

Another option for fabricating the anti-counterfeiting device is to form a pattern of conductive material on the substrate using gravure printing technology. In this type of printing a pattern of conductive ink, e.g., metal ink, is deposited onto a surface of the substrate using an engraved roller having a corresponding pattern engraved into its surface. In some gravure printing implementations, the substrate may pass between the engraved roller and a pressure roller as the ink is applied. The pattern of ink on the substrate surface may be dried or cured by a subsequent heating stage.

Another option for fabricating the anti-counterfeiting device is to deposit conductive material onto a surface of the substrate through a stencil mask. In this type of fabrication, a stencil mask having a desired pattern of openings is placed on a surface of the substrate or in close proximity to the surface of the substrate. The openings expose selected portions of the substrate. Conductive material may then be deposited over the stencil mask and onto the exposed portions of the substrate underlying the openings in the stencil mask. The material may be deposited using any suitable technique, e.g., metal ink printing, chemical vapor deposition (CVD), physical vapor deposition (e.g., laser-assisted metal deposition), and the like. The stencil mask may then be removed leaving behind a pattern of conductive material on the substrate surface.

Another option for fabricating the anti-counterfeiting device is metal layer ablation by scanning a laser beam across a layer of metal to ablate selected portions of the layer.

Another option for fabricating the anti-counterfeiting device is laser-assisted deposition. In this technique the conductive material is formed from an interaction between one or more reactant gases and a laser beam. The beam may be operated in a pulsed mode. The beam passes through the reactant gas(es) and impinges on a surface of the substrate either at perpendicular incidence or at an angle. A reaction between the gas, the substrate surface, and the laser beam forms a conductive material that adheres to the surface. If the beam spot is sufficiently small, a pattern of conductive material could be produced without a mask by selectively turning the beam on and off as the substrate moves relative to the beam or vice versa. Alternatively, a mask may be used in conjunction with laser-assisted deposition to form the pattern. By way of example, silicon can be deposited on a glass surface using Silane ($SiH_4$) as a reactant gas and a laser beam characterized by a vacuum wavelength of 193 nm. Such a beam of sufficient intensity could be produced, e.g., using a pulsed ArF laser.

Yet another option for fabricating the anti-counterfeiting device is to use laser-assisted etch. This technique uses a highly absorbing media in contact with the material being etched. By way of example, a metal target in contact with the material to be etched (e.g., quartz, glass, or semiconductor) may be used as an absorber. Removal of the material is assisted by the plasma generated by the metal target where the laser light is absorbed.

The laser etching of materials can be also assisted with a suitable liquid solution (for example $CrO_3$) in contact with the material to be etched. In such cases a temperature increase resulting from strong absorption of laser light at the thin interface between the liquid and the material enhances the etching. The rapid temperature increase leads to heating of the material and thermal decomposition of the solution into non-soluble $Cr_2O_3$ deposits. The thin film of non-soluble $Cr_2O_3$ formed on the substrate results in a further rise of the laser induced temperature that follows the absorption of subsequent laser pulses. Due to the difference in the thermal expansion coefficients between the $Cr_2O_3$ film and material substrate the removal of the material is achieved.

Figure 5:
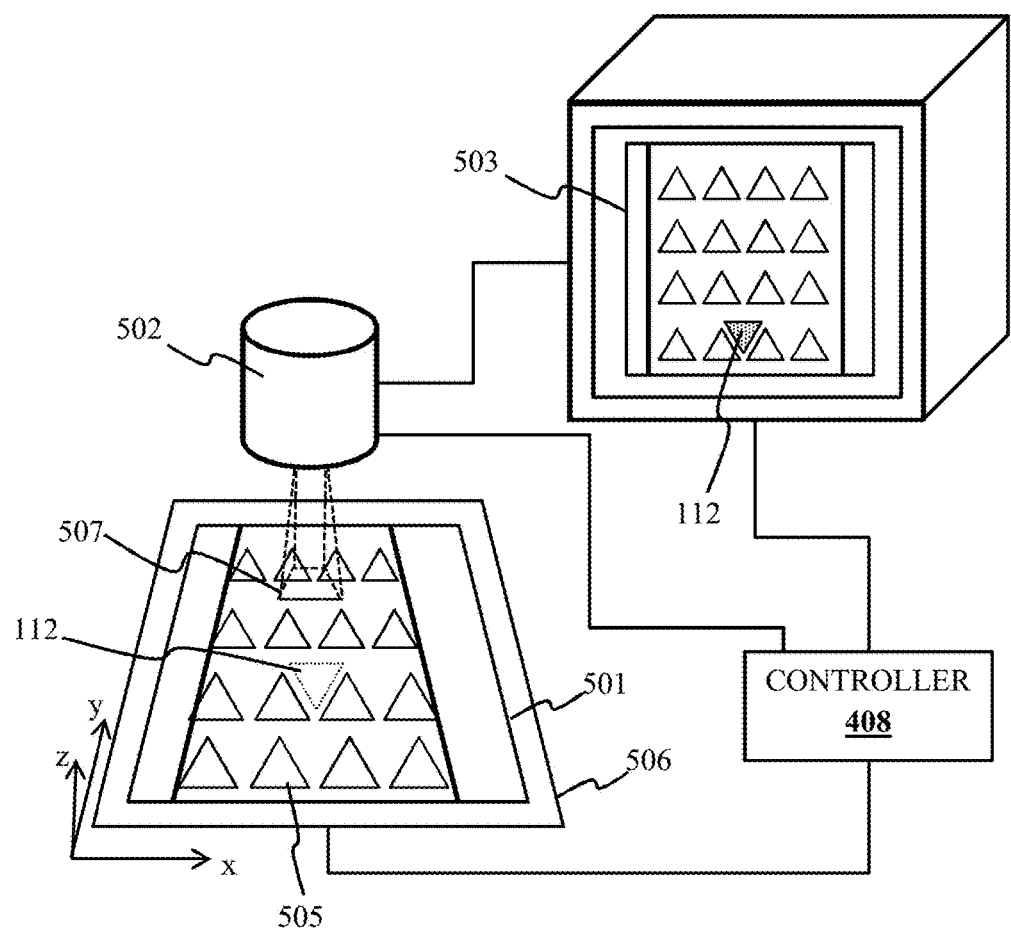
FIG. 5 is a schematic diagram illustrating use of a sheet resistance metrology system to image an anti-counterfeiting device according to an aspect of the present disclosure.

FIG. 5 illustrates the use of a sheet resistance metrology system 500 to image an anti-counterfeiting pattern. The system 500 generally includes a sensor head 502 coupled to an imaging system 504. The sensor head 502 produces an output signal in response to some form of input that is applied to a sample 501 that includes an anti-counterfeiting pattern 112 of the type described above. The output signal is related to the input signal in a way that depends on the sheet resistance of the sample 501. The imaging system 504 interprets the output signal from the sensor head 502 and generates an image 503 of the sample 501, which can be stored in electronic form or presented on a visual display. In the image 503, differences in sheet resistance are made apparent, e.g., using a suitable color or intensity scale. In the illustrated example, the sample 501 includes multiple device structures 505 and the anti-counterfeiting pattern 112 (shown in phantom) is invisible to the unaided eye but visible in the image 503, which may be in the form of a sheet resistance map of the sample 501 or a portion thereof.

The sample 501 can be any suitable product, device, or material that bears an anti-counterfeiting pattern. By way of example, and not by way of limitation, the anti-counterfeiting pattern may be integrated into a sample in the form of a touch screen sensor, smart window, electromagnetic interference (EMI) shield, transparent heater, or solar panel.

The system may include an optional stage 506 and controller 508. The sample may be mounted to the stage 506. The stage can translate and/or rotate the sample with respect to the sensor head 502. The controller 408 may be a special purpose computer or a general purpose computer configured to control operation of one or more of the sensor head 502, the imaging system 504, and the stage 506.

By way of example, and not by way of limitation, the sensor head 502 may include an element that detects terahertz (Thz) radiation. The system may include or work in conjunction with a source that directs Thz radiation toward the sample. In some configurations, the Thz radiation source may be integrated into the sensor head. In some implementations, the Thz radiation may be directed at a small portion 507 of the sample 501 and/or the sensor may only detect Thz radiation emitted from that small portion. In such cases, the stage 506 can translate the sample 501 with respect to the sensor head with respect to x, y, and z axes so that the sensor head 502 can collect TeraHertz (THz) radiation from different parts of the sample. The controller 508 can provide the imaging system 504 with stage position information that the imaging system can correlate with the output signal from the sensor head 502 to produce the image 503.

In alternative implementations, the sensor head 502 may include electromagnets that produce a changing magnetic flux within the sample 501 or small portion 507 thereof and sensors that detect the effects of the resulting eddy currents within the sample. Again, the stage 506 can translate the sample 501 with respect to the sensor head with respect to x, y, and z axes so that the sensor head 502 can sense eddy currents from different parts of the sample.

Figure 6:
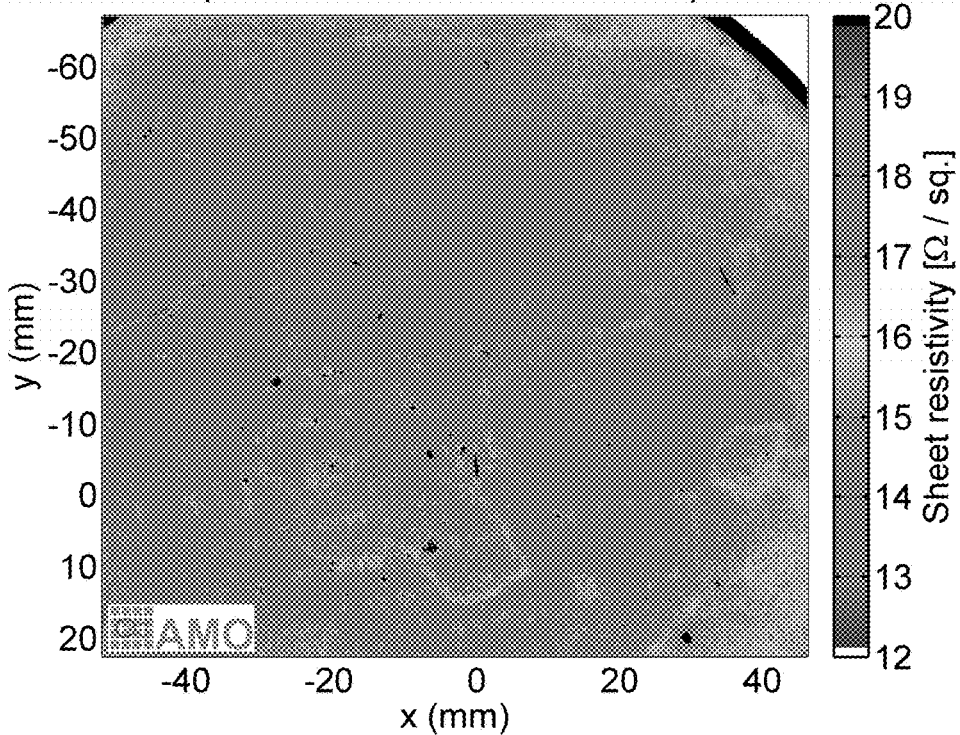
FIG. 6 is a screen shot of an example of a sheet resistance map a metal mesh imaged using a Terahertz imaging system equipment according to an aspect of the present disclosure.

By way of example, FIG. 6 is a screen shot of an example of a sheet resistance map a metal mesh imaged using a Terahertz imaging system equipment according to an aspect of the present disclosure. The image was obtained using a TeraSpike-800-X-HRS Terahertz imaging system from AMO GmbH of Aachen, Germany. The sheet resistance map in the image us for a metal mesh having about 3 Ohm/sq deviations of sheet resistance over an 80 mm×80 mm area.

Figure 7:
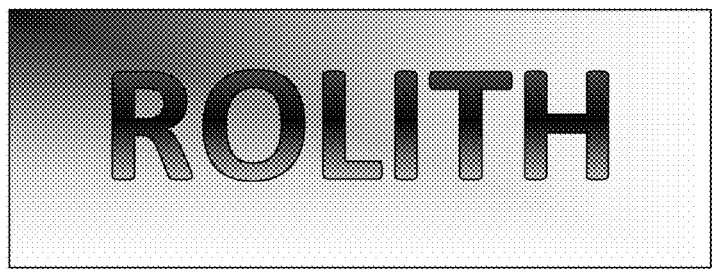
FIG. 7 is an example of a covert anti-counterfeiting feature in the form of a company Logo as could be seen on a sheet resistance map according to an aspect of the present disclosure.

There are many different possible configurations for anti-counterfeiting devices within the scope of the present disclosure. By way of example, and not by way of limitation, FIG. 7 shows an example of a covert anti-counterfeiting feature in the form of a company logo as could be seen on a sheet resistance map.

By way of alternative example, anti-counterfeiting devices of the type described in this disclosure may be implemented as integrated parts of a functional transparent metal mesh conductor element (electrode) in various devices. For example, the transparent conductor for capacitive touch sensor in a display, which is created on a glass (cover lens) or polymer film, can be engineered to have a specific and distinctive pattern of sheet resistance distribution (e.g., in the form of Logo, bar code, image, etc.). Such sheet resistance distribution could be designed to have a range that would not affect the basic performance of the device as a touch screen (e.g., few Ohm/sq deviations), and would add an anti-counterfeiting feature to the device. Similarly, such "integrated anti-counterfeiting conductors" could be used as EMI shields and transparent heaters (in displays and other products), electrodes in smart windows (electrochromic devices), solar panels, OLED lighting products, etc. etc.

Figure 8:
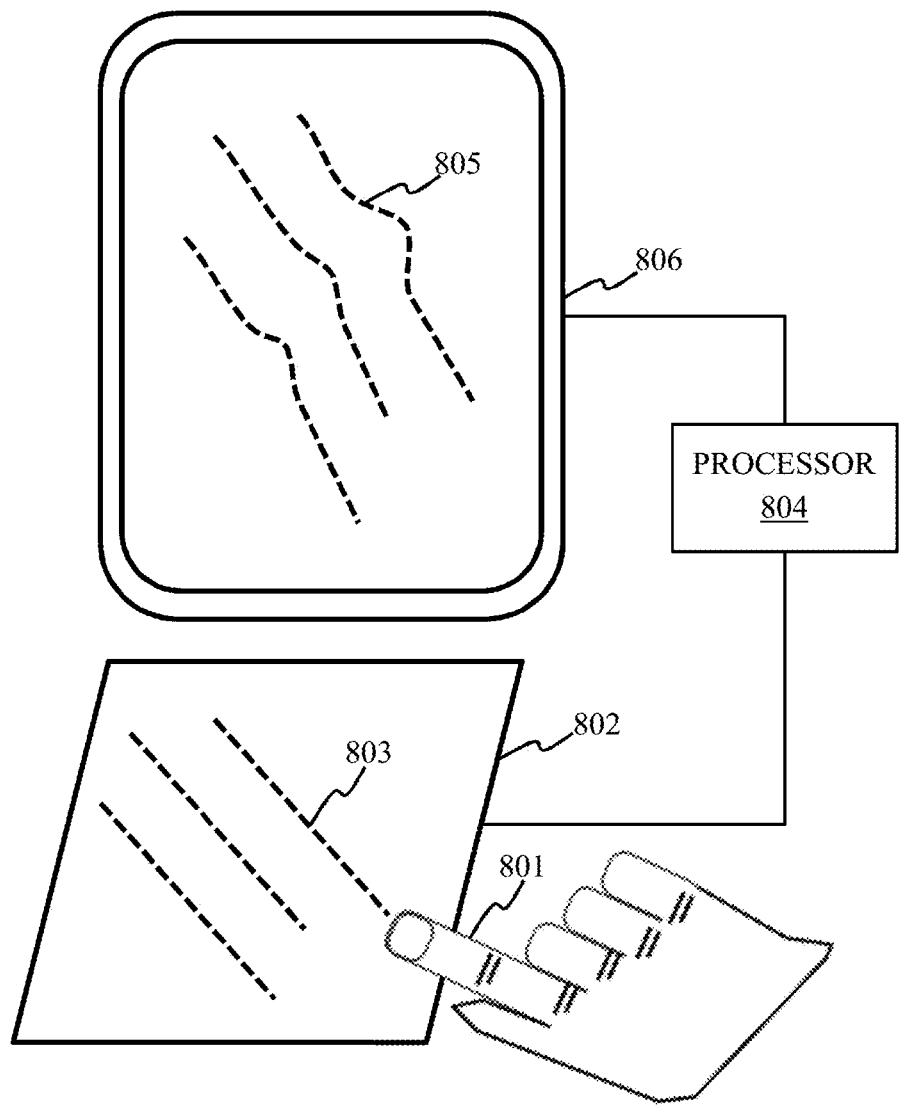
FIG. 8 is an example of a touch screen that incorporates a pattern of sheet resistance variation that can be revealed as an anti-counterfeiting pattern according to an aspect of the present disclosure.

Distribution of sheet resistance described in the example of a touch screen can be interrogated (revealed) by touch of a finger or stylus (multi-touch, slide, or other movement on the surface). The resulting image or trace could be revealed directly on the touch screen display (using some "drawing software"). By way of example as shown in FIG. 8, when a touch sensor 802 is interrogated by passing a finger 801 over it in a pattern of straight lines 803 the variation in sheet resistance within the touch sensor results in curved traces 805 on a display 806 when the inputs are interpreted conventionally through a processor 804. The "non-linearity" of the traces 805 shows the sheet resistance distribution in the touch sensor 802. Such sheet resistance distributions may be engineered as a distinctive and recognizable pattern, such as a company logo image, bar code, QR code, number, etc.

The hardware and/or software of the processor 804 that interprets the touch sensor input is based on the assumption that the sheet resistance is uniform (or varies in some known way). Varying the sheet resistance of the touch sensor while maintaining conventional assumptions in the sensor interpretation software/hardware of the processor 804 causes straight traces to be interpreted and displayed as bent lines. In some implementations the processor may implement an algorithm that operates in two modes, a normal touch screen mode and an anti-counterfeiting mode. In the normal mode the algorithm recognizes any sheet resistance/capacitance values that fall within a specified range (+/−X) as the same values (uniform/linear response) and ignore fine variations within that range, e.g., by averaging the input data. In the anti-counterfeiting mode, by contrast, the algorithm treats fine variations of sheet resistance/capacitance as signal data and interprets such variations accordingly (e.g., by not averaging the input data).

As may be realized from the foregoing description, aspects of the present disclosure provide anti-counterfeiting that is relatively simple to fabricate but relatively difficult to detect.

More generally it is important to note that while the above is a complete description of the preferred embodiments of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" when used in claims containing an open-ended transitional phrase, such as "comprising," refers to a quantity of one or more of the item following the article, except where expressly stated otherwise. Furthermore, the later use of the word "said" or "the" to refer back to the same claim term does not change this meaning, but simply re-invokes that non-singular meaning. The appended claims are not to be interpreted as including means-plus-function limitations or step-plus-function limitations, unless such a limitation is explicitly recited in a given claim using the phrase "means for" or "step for."

What is claimed is:

1. An anti-counterfeiting device, comprising:
a structure having an anti-counterfeiting pattern, wherein the anti-counterfeiting pattern comprises variations of sheet resistance, wherein the anti-counterfeiting pattern is identifiable as an anti-counterfeiting feature by sheet resistance mapping metrology.

2. The device of claim 1, wherein the anti-counterfeiting pattern is invisible to unaided human eyes.

3. The device of claim 1, wherein the structure is formed in a device layer where device features are formed.

4. The device of claim 1, wherein the structure is formed on top of a device layer where device features are formed.

5. The device of claim 2, wherein the anti-counterfeiting pattern comprises lines having a linewidth less than 2 microns.

6. The device of claim 1, wherein the anti-counterfeiting pattern is in a form of recognizable characters.

7. The device of claim 1, wherein the anti-counterfeiting pattern is a pattern similar to surrounding device features that is deliberately shifted and/or rotated.

8. The device of claim 1, wherein the anti-counterfeiting pattern is a bar code.

9. The device of claim 1, wherein the anti-counterfeiting pattern is characterized by a specific gradient of sheet resistance.

10. The device of claim 1, wherein the sheet resistance mapping metrology includes Eddy current metrology or Terahertz microprobe-based metrology.

11. The device of claim 1 wherein the structure having the anti-counterfeiting pattern is integrated into a touch screen sensor, smart window, electromagnetic interference (EMI) shield, transparent heater, or solar panel.

12. A method for detecting an anti-counterfeiting device having an anti-counterfeiting pattern, wherein the anti-counterfeiting pattern comprises variations of sheet resistance, the method comprising imaging the anti-counterfeiting pattern comprising the variations of sheet resistance with a sheet resistance mapping metrology system.

13. The method of claim 12, wherein the sheet resistance mapping metrology includes Eddy current metrology or Terahertz microprobe-based metrology.

14. The method of claim 12, wherein the anti-counterfeiting pattern comprises lines characterized by a linewidth less than 2 microns.

15. The method of claim 12, wherein the anti-counterfeiting pattern is integrated into a sample in the form of a touch screen sensor, smart window, electromagnetic interference (EMI) shield, transparent heater, or solar panel.

16. The method of claim 12, wherein the imaging of the anti-counterfeiting pattern comprising the variations of sheet resistance with a sheet resistance mapping metrology system provides a sheet resistance map, the method further comprising identifying the anti-counterfeiting pattern from the sheet resistance map.

17. A method of fabricating an anti-counterfeiting device, the method comprising:
forming a structure over a substrate, wherein the structure has an anti-counterfeiting pattern, wherein the anti-counterfeiting pattern comprises variations of sheet resistance, wherein the anti-counterfeiting pattern is identifiable as anti-counterfeiting features by sheet resistance mapping metrology.

18. The method of claim 17, wherein forming the structure over the substrate comprises providing a photosensitive layer on a conductive layer over the substrate, patterning and developing the photosensitive layer to form a patterned photosensitive layer, etching and removing portions of the conductive layer exposed from the photosensitive layer and the photosensitive layer to form the structure with the anti-counterfeiting pattern.

19. The method of claim 17, wherein forming the structure over the substrate includes disposing a photo-sensitive material over the substrate, developing the photo-sensitive material to produce a mesh pattern in the developed photo-sensitive material and using the developed photo-sensitive material includes forming a layer of conductive material over the developed photo-sensitive material and onto portions of the substrate exposed by openings in the developed photo-sensitive material, and removing the photo-sensitive material leaving behind conductive material on the substrate at the portions corresponding to the openings.

20. The method of claim 17, wherein forming the structure over the substrate includes applying a pattern of conductive material to a surface of the substrate using inkjet technology.

21. The method of claim 17, wherein forming the structure over the substrate includes applying a pattern of conductive material to a surface of the substrate using gravure printing technology.

22. The method of claim 17, wherein forming the structure over the substrate includes patterning a layer of metal over the substrate.

23. The method of claim 22, wherein the layer of metal is patterned by laser ablation.

24. The method of claim 17, wherein forming the structure over the substrate includes laser-assisted deposition or etch.

25. The method of claim 17, wherein forming the structure over the substrate includes depositing metal through a stencil mask.

26. The method of claim 17, the anti-counterfeiting pattern comprises lines characterized by a linewidth that is less than 2 microns.

27. The method of claim 17, wherein the anti-counterfeiting pattern is integrated into a sample in the form of a touch screen sensor, smart window, electromagnetic interference (EMI) shield, transparent heater, or solar panel.

28. The method of claim 17 wherein the anti-counterfeiting pattern is invisible to unaided human eyes.

* * * * *